United States Patent
Lee et al.

(10) Patent No.: US 8,721,772 B2
(45) Date of Patent: May 13, 2014

(54) SYSTEMS AND METHODS FOR PERFORMING INDUSTRIAL PROCESSES THAT GENERATE PYROPHORIC PARTICLES

(75) Inventors: Jeffrey T. Lee, Forest, VA (US); Roger D. Ridgeway, Lynchburg, VA (US); Jeffrey W. Austin, Evington, VA (US); Scott L. Fitzner, Appomattox, VA (US)

(73) Assignee: Babcock & Wilcox mPower, Inc., Charlotte, NC (US)

( * ) Notice: Subject to any disclaimer, the term of this patent is extended or adjusted under 35 U.S.C. 154(b) by 50 days.

(21) Appl. No.: 13/439,934

(22) Filed: Apr. 5, 2012

(65) Prior Publication Data

US 2013/0263737 A1    Oct. 10, 2013

(51) Int. Cl.
*B01D 46/00* (2006.01)
(52) U.S. Cl.
USPC ............. 95/279; 55/385.1; 55/385.2; 55/283; 55/302; 219/121.14; 219/121.63; 219/137 R
(58) Field of Classification Search
USPC ................. 55/385.1, 385.2, 437, 465, 471, 55/DIG. 18, DIG. 29, DIG. 46; 454/187; 134/12, 21, 31, 107, 111; 219/121.14, 219/121.63, 137 R; 376/260
See application file for complete search history.

(56) References Cited

U.S. PATENT DOCUMENTS

| | | | | |
|---|---|---|---|---|
| 4,492,843 A * | 1/1985 | Miller et al. | ............. | 219/121.63 |
| 4,659,901 A * | 4/1987 | Rieben | ............. | 219/121.63 |
| 5,702,493 A * | 12/1997 | Everetts et al. | ............. | 55/356 |
| 6,391,093 B1 * | 5/2002 | French et al. | ............. | 95/226 |
| 6,621,848 B1 * | 9/2003 | Ullman et al. | ............. | 372/89 |
| 7,503,951 B2 * | 3/2009 | Dudash et al. | ............. | 55/385.1 |
| 8,461,474 B2 * | 6/2013 | Wollenhaupt et al. | ... | 219/121.14 |
| 2009/0065489 A1 * | 3/2009 | Duffy | ............. | 219/137 R |

* cited by examiner

*Primary Examiner* — Duane Smith
*Assistant Examiner* — Minh-Chau Pham
(74) *Attorney, Agent, or Firm* — Michael J. Seymour; Eric Marich

(57) ABSTRACT

A process chamber is configured to contain a work piece in a controlled atmosphere and to perform a process that emits pyrophoric particulates. A closed recirculating loop connected with the process chamber recirculates gas defining the controlled atmosphere through the process chamber. A filter in the closed recirculating loop captures the generated pyrophoric particulates in the recirculating gas. A valve set has a work configuration defining the closed recirculating loop including the connection of the process chamber with the filter, and a filter regeneration configuration in which the filter is blocked off from the process chamber and is connected with an exhaust. A work piece is loaded into the process chamber. With the valve set in the work configuration, the process is performed on the loaded work piece. Thereafter, regeneration gas containing oxygen is delivered to the filter with the valve set in the regeneration configuration.

29 Claims, 4 Drawing Sheets

SYSTEMS AND METHODS FOR PERFORMING INDUSTRIAL PROCESSES THAT GENERATE PYROPHORIC PARTICLES

BACKGROUND

The following relates to the industrial processing arts, industrial safety arts, controlled atmosphere processing arts, and related arts.

Certain types of industrial processes generate pyrophoric particles. For example, in the nuclear power industry, some components are selected to be constructed of zirconium alloy material due in part to low neutron absorption characteristics of these alloys. However, high temperature processes such as welding, cutting, and so forth applied to zirconium alloy material can not only be corrosive to material performance if done in an oxygen environment but further tend to generate zirconium alloy particulates regardless of fabrication environment. In an oxygen environment the higher surface area-to-volume ratio of these particulates compared with the bulk material enhances their oxidation characteristics to a point where these particulates become flammable and can spontaneously combust in air or in response to a spark or other ignition source. Accordingly, for these and other reasons such processing is typically performed in an inert atmosphere such as an argon atmosphere. However, the generated pyrophoric particulates must still be dealt with.

Historically, the process exhaust was vented to atmosphere. An ignition source might be included in the chimney or vent to encourage burning of any pyrophoric particles. However, airborne metallic particulates can cause respiratory problems and raise other environmental concerns. Accordingly, modern processing methodologies filter out the metallic particulates, including pyrophoric particulates, from the exhaust stream prior to exhausting to atmosphere.

The filtering of metallic particulates is performed using wet scrubbers and/or dry filters. In the case of zirconium alloy processing a conventional approach is to employ a wet scrubber to capture most pyrophoric particles, followed by a dry filter for final cleanup prior to exhausting to atmosphere. However, in processes that generate high concentrations of very small pyrophoric particulates, the wet scrubbers are not highly effective. For example, in some zirconium alloy processes greater than 50% of the pyrophoric particulates are smaller than 1 micron in diameter, and these small particulates are not effectively removed by the wet scrubber. In such cases, the dry filter accumulates pyrophoric particulates rapidly, and must be replaced on a frequent basis—failure to do so can result in spontaneous combustion of pyrophoric particulates in the dry filter and possible fire and/or explosion.

BRIEF SUMMARY

In one aspect of the disclosure, an apparatus comprises: a process chamber configured to contain a work piece in a controlled atmosphere and to perform a process on the work piece in the process chamber that emits pyrophoric particulates into the controlled atmosphere; a closed recirculating loop connected with the process chamber to recirculate gas defining the controlled atmosphere through the process chamber; a filter disposed in the closed recirculating loop and configured to capture the generated pyrophoric particulates in the recirculating gas; and a valve set configured to have (1) a work configuration defining the closed recirculating loop including the connection of the process chamber with the filter and (2) a filter regeneration configuration in which the filter is blocked off from the process chamber and is connected with an exhaust.

In another aspect of the disclosure, a method is performed using the apparatus of the immediately preceding paragraph. The method comprises: (i) loading a work piece into the process chamber; (ii) with the valve set in the work configuration, performing the process on the loaded work piece that emits pyrophoric particulates into the controlled atmosphere; and (iii) after performing operation (ii), delivering regeneration gas containing oxygen to the filter with the valve set in the regeneration configuration.

In another aspect of the disclosure, a method is disclosed. A process is performed on a work piece. The process emits pyrophoric particulates into a controlled atmosphere contained in a process chamber. During the performing of the process, a gas defining the controlled atmosphere is recirculated through (i) the process chamber and (ii) a filter configured to capture the pyrophoric particulates. After performing the process, the filter is regenerated by flowing regeneration gas including oxygen through the filter.

In another aspect of the disclosure, an apparatus comprises: a process chamber configured to contain a work piece in a controlled atmosphere and to perform a process on the work piece in the process chamber that emits pyrophoric particulates into the controlled atmosphere; a closed recirculating loop connected with the process chamber to recirculate gas defining the controlled atmosphere through the process chamber; a filter disposed in the closed recirculating loop and configured to capture the generated pyrophoric particulates in the recirculating gas wherein the filter has an inlet side receiving gas flowing from the process chamber and a discharge side; and a valve set configured to have (1) a work configuration defining the closed recirculating loop including the connection of the process chamber with the inlet side of the filter and (2) a filter regeneration configuration in which the inlet side of the filter is blocked off from the process chamber and is connected with an exhaust.

In another aspect of the disclosure, a method is performed using the apparatus of the immediately preceding paragraph. The method comprises: (i) loading a work piece into the process chamber; (ii) with the valve set in the work configuration, performing the process on the work piece loaded in the process chamber that emits pyrophoric particulates into the controlled atmosphere; and (iii) after performing operation (ii), delivering regeneration gas containing oxygen to the discharge side of the filter with the valve set in the regeneration configuration.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIG. 1 shows the system in the welding configuration;
FIG. 2 shows the system set for argon evacuation; and
FIG. 3 shows the system in a filter regeneration configuration.

DETAILED DESCRIPTION OF THE PREFERRED EMBODIMENTS

Figure 1:
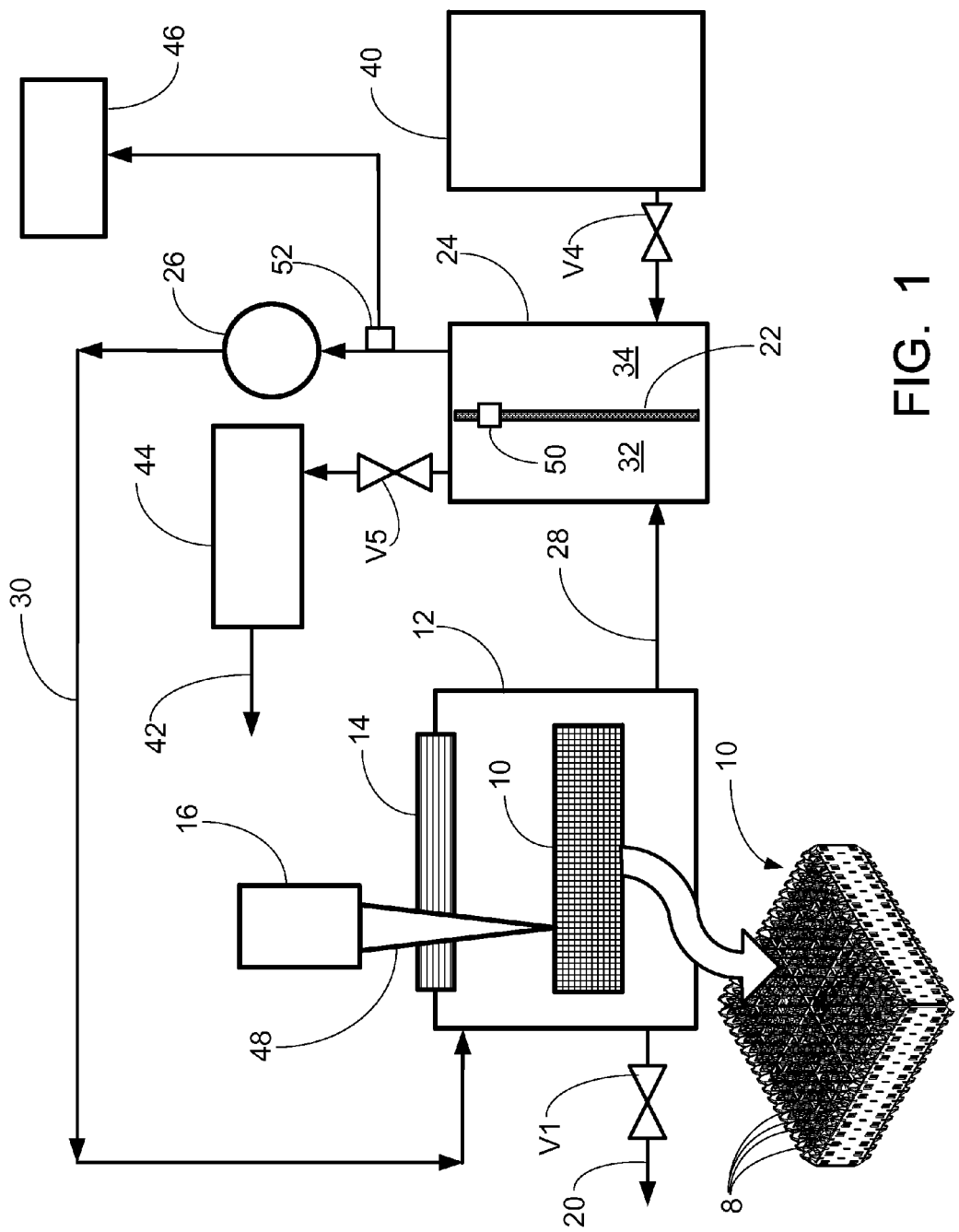
FIGS. 1-3 diagrammatically show diagrammatic representations of a welding system employs recirculating argon in the welding of zirconium alloy components, where.

With reference to FIG. 1, an illustrative welding system for performing welding of zirconium alloy components is shown. The welding system may, by illustrative example, be used to weld an interlocked assembly of zirconium alloy straps in order to construct a nuclear fuel assembly spacer grid component. In this illustrative example, an interlocked assembly of zirconium alloy straps 8 (shown in an inset perspective view only in FIG. 1) defines a zirconium alloy work piece 10 that is placed into a welding chamber 12. (Alternatively, the metal straps may be made of a material other than a zirconium alloy, such as steel or Inconel). This illustrative embodiment is configured to perform laser welding—for this purpose, the welding chamber 12 includes a window 14 of glass or another material that is transparent to light generated by a welding laser source 16. (It is to be appreciated that the term "light" as used here may encompass electromagnetic radiation outside of the visible spectrum, such as ultraviolet light or infrared light). The welding chamber 12 is sufficiently airtight to enable it to be filled with an inert gas such as argon during processing of the work piece 10 without having unacceptable leakage of argon during the processing. Typically, the welding chamber 12 is sufficiently airtight that it can be evacuated to a pressure of less than 50 mTorr, and more preferably less than 10 mTorr, and in some embodiments 1 mTorr or lower, using a mechanical vacuum pump; however, a more leaky (or less) chamber is also contemplated.

More generally, the work piece may be any work piece whose processing by the system generates pyrophoric particles. For example, the work piece may be a zirconium alloy blank that is to be cut, grinded, polished, or otherwise processed to form a desired component using a cutting, grinding, polishing, or other process that generates pyrophoric zirconium alloy particulates. Other materials that tend to generate pyrophoric particulates under processing include magnesium, titanium, hafnium, zinc, uranium, thorium, various alloys of the foregoing, and so forth. Depending upon the type of processing, materials such as steel may also generate pyrophoric particulates, especially when the processing produces very small-diameter particulates having high surface area-to-volume ratios. Process parameters such as exhaust temperature and chemical composition can also impact the whether the generated particulates are pyrophoric in the exhaust environment. Moreover, in some processes the pyrophoric particulates may be generated from abrasives or other components, other than the work piece, that are used in the process.

The welding chamber 12 may, in more general terms, be any process chamber in which a work piece undergoes a process that generates pyrophoric particulates. In non-optical processes such as mechanical cutting or grinding, the window 14 may be omitted (or, alternatively, may be retained in order to allow visual monitoring of the process). Although not shown in FIG. 1, the process chamber 12 includes a sealable door for introducing the work piece and removing it after the process is complete. Alternatively, a load lock can be used for this purpose so as to load and unload work pieces without evacuating the argon or other inert atmosphere. In the case of mechanical cutting or grinding, the chamber is configured to perform the process by including suitable robotic cutting or grinding implements inside the process chamber.

The process which generates pyrophoric particles is performed in a controlled atmosphere in which the oxygen level is too low for the pyrophoric particulates to oxidize. Typically, an inert atmosphere comprising a gas such as argon is used. Nitrogen is also an option for some processes—however, zirconium alloys tend to detrimentally interact with nitrogen. It is also contemplated for the controlled atmosphere to be at a pressure other than atmospheric pressure, and/or to have a specified flow rate. (For example, in laser welding applications a high flow rate can reduce buildup of fumes on the optical window 14 and consequent partial occlusion of the laser beam). Before beginning the process, the chamber 12 is evacuated and filled with the controlled atmosphere (e.g., filled with argon in the instant example). In the illustrative system of FIGS. 1-3, a single pipe or tube 20 is selectively connected with a vacuum pump or house vacuum (not shown) or with a gas cylinder or other source of the argon or other gas that makes up the controlled atmosphere (also not shown). Alternatively, separate vacuum and gas inlet lines may be provided. Optionally, the evacuation/fill operations are repeated one or more times to provide more complete removal of residual oxygen.

Figure 2:
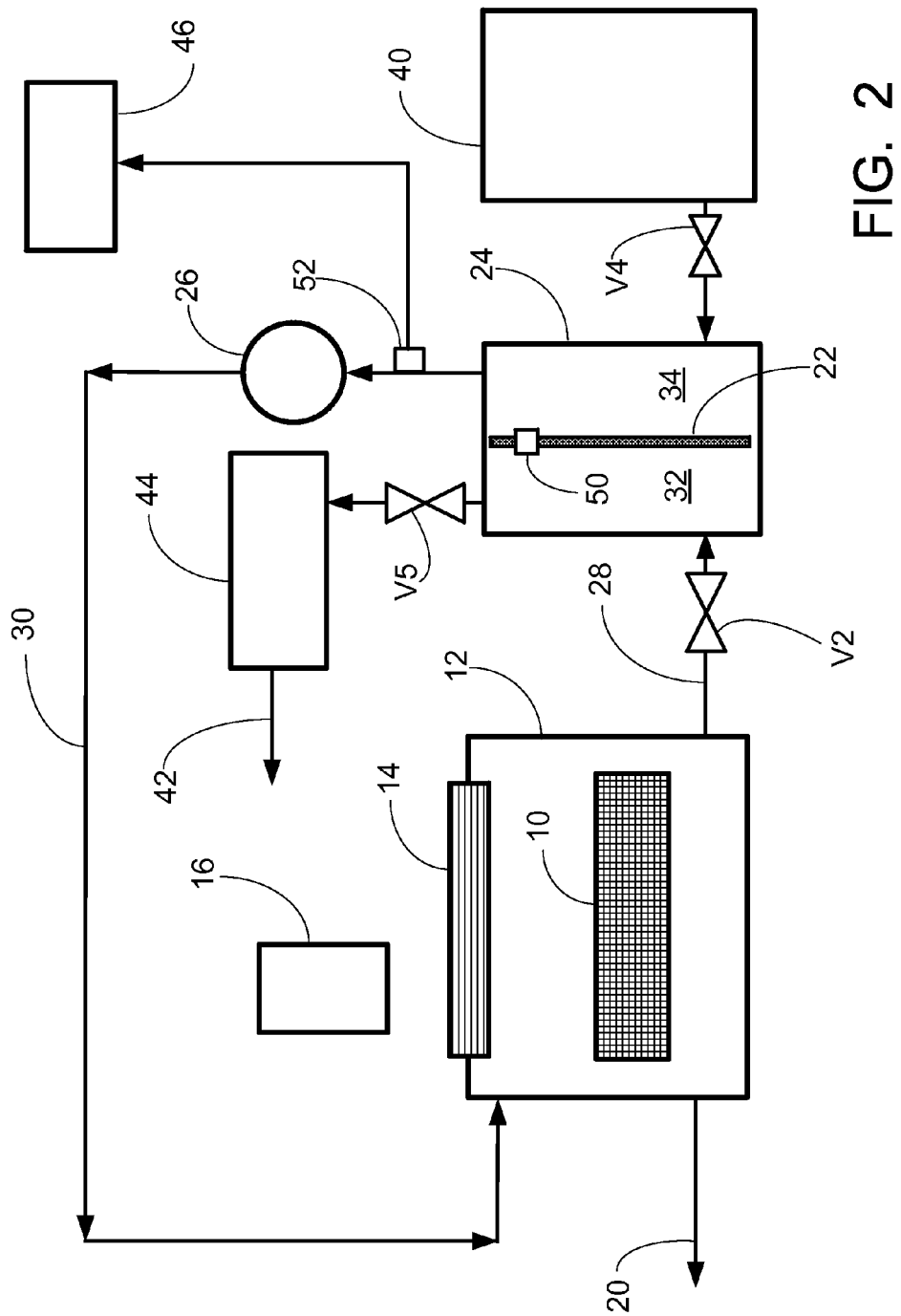
Figure 3:
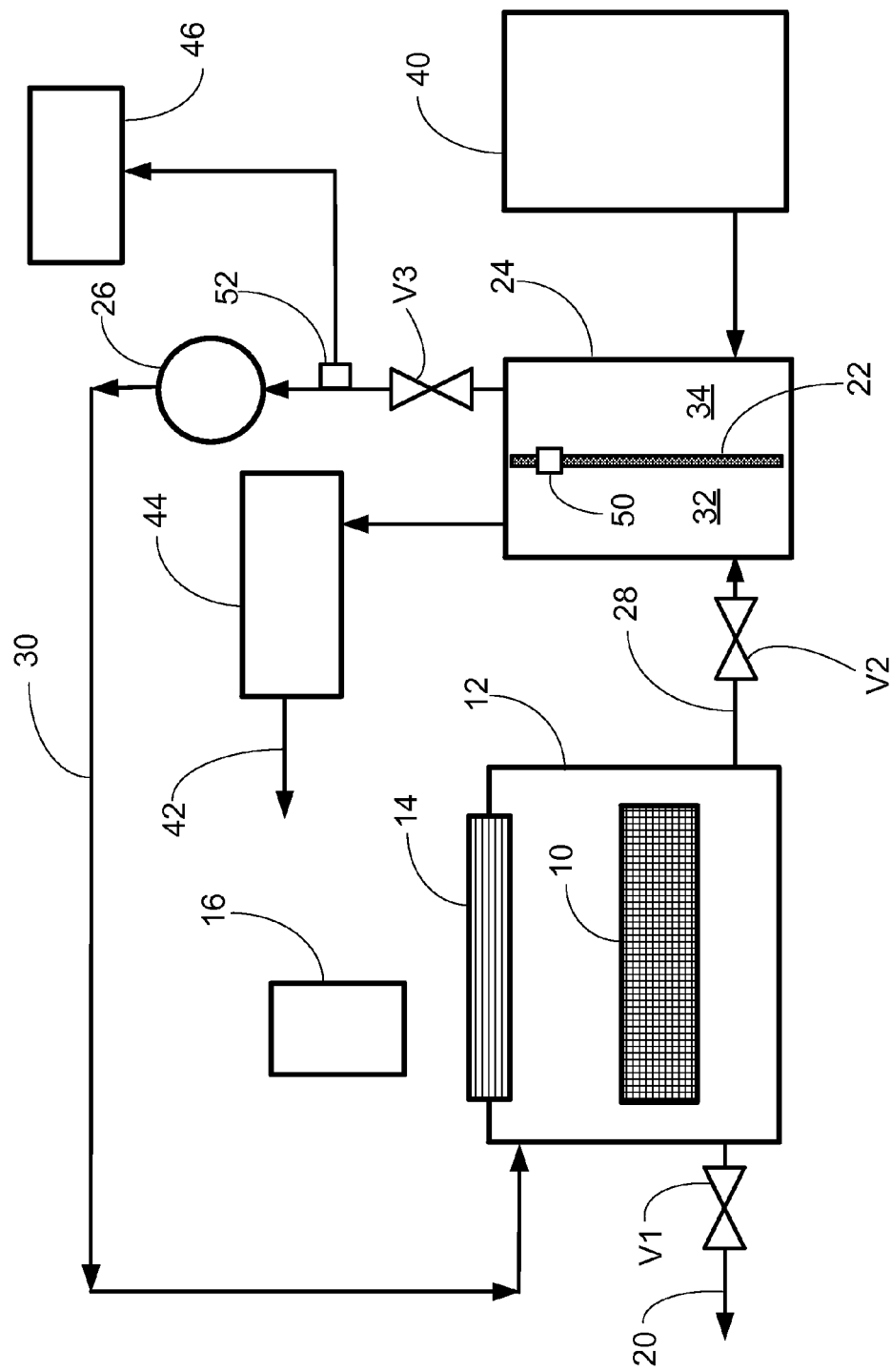

The disclosed process systems employ recirculation of the controlled atmosphere through a closed recirculation loop that is connected with the process chamber 12 and includes a filter 22 configured to capture the generated pyrophoric particulates in the recirculating gas defining the controlled atmosphere (e.g., argon gas). The closed recirculation loop of the illustrative embodiment of FIG. 1 includes a filter housing 24 containing the filter 22, a blower or pump 26 for driving the recirculation of the gas (e.g., argon) defining the controlled atmosphere, a pipe or tube 28 running from the process chamber 12 to the filter housing 24, and a pipe or tube 30 running from the filter housing 24 back to the process chamber 12. As seen in FIGS. 1-3, the blower or pump 26 is mounted on or operatively engages with the pipe or tube 30. The blower or pump 26 is arranged to drive the gas (e.g., argon) defining the controlled atmosphere in the direction in which the gas discharged from the process chamber 12 into the pipe 28 flows to the filter housing 24 and into an inlet side 32 of the filter 22. The gas is filtered by the filter 22 and discharges at a discharge side 34 of the filter 22, and then flows via pipe 30 back to the process chamber 12. (In the illustrative system representation shown in FIG. 1, the flow of argon gas is counter-clockwise).

The system further includes components for regenerating the filter 22, including a regeneration gas source 40 delivering regeneration gas containing oxygen to the discharge side 34 of the filter 22, and an exhaust 42 which in the illustrative embodiment includes an exhaust filter 44. The regeneration gas may be compressed air, which typically includes 21% oxygen, 78% nitrogen and 1% "other gases". Alternatively, the regeneration gas may be regeneration gas comprising greater than 22% oxygen, such as an air/$O_2$ mixture.

The system further includes a valve set, which in the illustrative embodiment includes: a valve V1 that opens or closes the combined vacuum/argon line 20; a valve V2 that selectively closes the pipe or tube 28 to isolate the discharge of the process chamber 12 from the filter housing 24; a valve V3 that selectively opens or closes the pipe 30 running from the filter housing 24 back to the process chamber 12; a valve V4 that selectively connects the regeneration gas source 40 to the discharge side 34 of the filter 22; and a valve V5 that selectively connects the inlet side 32 of the filter 22 with the exhaust 42. Note that in the diagrammatic system representations of FIGS. 1-3, valves are shown only when they are in the closed position. FIG. 1 shows a work configuration of the valve set in which only valves V1, V4, V5 are closed; valves V2, V3 are open to form the closed recirculating loop and hence are not shown. FIG. 2 shows an evacuation configuration in which valves V2, V4, V5 are closed and valves V1, V3 are open and hence not shown. FIG. 3 shows a filter regeneration configuration in which valves V1, V2, V3 are closed and valves V4, V5 are open and hence not shown. A valve set controller 46 is optionally provided to automatically open and close valves of the valve set to achieve the various working, evacuation, and filter regeneration configurations shown in FIGS. 1-3, respectively. Alternatively, the valves of the valve set can be manually operated. If provided, the valve set controller 46 is operatively connected with the various valves V1, V2, V3, V4, V5 by suitable electrical, pneumatic, or other actuation lines (not shown), or alternatively employs wireless communication with local valve controller units disposed with the individual valves.

In the following, operation of the system is described in greater detail. In overview, the welding process (or, more generally, the process that emits pyrophoric particulates into the controlled atmosphere) is performed using the working configuration shown in FIG. 1. In this configuration the gas (e.g. argon) defining the controlled atmosphere is recirculated through the process chamber 12. After the process is complete, the controlled atmosphere is removed using the evacuation configuration shown in FIG. 2, and then the filter 22 is regenerated using the filter regeneration configuration shown in FIG. 3.

With particular reference to FIG. 1, once the gas fill operation is complete the valve V1 is closed to seal off the process chamber 12. (As previously noted, this preparatory phase may optionally include multiple evacuation/fill operations to more completely remove residual oxygen). FIG. 1 shows the working configuration with the valve V1 closed. The valves V2, V3 are open (and hence not shown in FIG. 1) in order to form the closed recirculation loop running from the discharge of the process chamber 12 through pipe 28, filter housing 24, and pipe 30 back to the process chamber 12. Valve V4 is closed to disconnect the regeneration gas source 40 from the filter housing 24, and valve V5 is closed to disconnect the exhaust 42 from the filter housing 24. The blower or pump 26 is operating in the working configuration to drive recirculation of the gas (e.g., argon) defining the controlled atmosphere. Because the valve V1 is closed, there is no inflow of argon into the system—rather, a fixed quantity of argon is recirculating through the system. Alternatively, V1 may remain slightly open to permit a small flow of the gas (e.g., argon) into the system thereby maintaining system pressure above atmospheric and inhibiting the atmosphere surrounding the system from leaking therein. In this manner, any leakage of the closed recirculating loop is leakage of the inert atmosphere out such that oxygen in the atmosphere does not leak in and contaminate the welding environment. The process (e.g., illustrative laser welding of the spacer grid) is performed, as diagrammatically indicated in FIG. 1 by illustrating the laser beam 48 in FIG. 1. The process injects pyrophoric particulates into the controlled atmosphere in the process chamber 12. The recirculating flow of the controlled atmosphere drives these pyrophoric particulates through the pipe 28 to the inlet side 32 of the filter 22, where the particulates are trapped or captured by the filter 22. In general, the filter 22 should be capable of capturing particles of the expected size of the pyrophoric particles, and should be capable of withstanding substantial heating (since the filter regeneration, to be described, entails heating). In some suitable embodiments, the filter 22 comprises at least one metallic filter plate. The pore size of the filter plate or plates depends upon the expected pyrophoric particulate size, which in turn depends upon the aspects such as the process being performed in the process chamber 12, the material and other characteristics of the work piece 10, and so forth.

In some embodiments, the at least one metallic filter plate includes a metallic filter plate having a pore size of 0.2 micron or smaller. In some embodiments, the at least one metallic filter plate includes a metallic filter plate having a pore size of 0.5 micron or smaller. In some embodiments, the at least one metallic filter plate includes a metallic filter plate having a pore size of 1.0 micron or smaller. In some embodiments, the at least one metallic filter plate includes a metallic filter plate having a pore size of 2.0 micron or smaller. In some embodiments multiple filter plates may be used. For example, the multiple filter plates may have successively smaller pore sizes in order to distribute the captive pyrophoric particulates over several filter plates (i.e., the largest particulates are caught by the first, largest-pore size plate, the next-largest particulates are caught by the second, somewhat smaller-pore size plate, and so forth until the smallest particulates are caught by the last, smallest-pore size plate). Instead of or in addition to metallic filter plates with discrete pores of uniform size, other filter configurations can be employed, such as one or more filter plates having a High-Efficiency Particulate Air (HEPA) filter type made up of interweaved metallic fibers. Another contemplated approach is use of an electrostatic filter as at least one component of the filter 22.

After the process that generates pyrophoric particulates is complete (e.g., after the laser welding is complete), the system is switched to the evacuation configuration shown in FIG. 2. This is done by closing the valve V2 to isolate the discharge of the process chamber 12 from the inlet side 32 of the filter 22 and opening the valve V1 with the tube or pipe 20 connected to a vacuum pump or house vacuum. The controlled atmosphere (e.g., argon) is evacuated via the pipe 20. Because valve V2 is closed, any suction applied to the filter 22 is applied through the pipe 30 to the discharge side 34 of the pipe. This is advantageous because it reduces the likelihood of a "reverse" flow (i.e. flow from filter discharge side 34 to filter inlet side 32) causing the dislodgement of captured pyrophoric particulates. The blower or pump 26 is typically turned off during the evacuation; alternatively, it may be left on to drive gas toward the vacuum pipe 20.

After the controlled atmosphere has been evacuated, the system is switched to the filter regeneration configuration shown in FIG. 3 by closing the valve V1 to switch out the vacuum/argon line 20, keeping valve V2 closed and closing valve V3 to isolate the filter housing 24, opening valve V4 to apply the regeneration gas to the discharge side 34 of the filter 22, and opening valve V5 to provide an exhaust path to the exhaust 42. The regeneration gas supplied by the regeneration gas source 40 contains oxygen. When the pyrophoric particles trapped by the filter 22 are exposed to the oxygen, they spontaneously oxidize and burn. Additionally or alternatively, a spark or flame may be applied by an ignition source 50 mounted on the filter 22 (as shown) or inside the filter housing 24 to induce combustion thereby ensuring the oxidation of the particles. The air flow produced by the flow of regeneration gas, in combination with forces generated by the combustion of the pyrophoric particulates, releases the particulates (or pieces thereof resulting from the combustion) from the filter 22 where they flow to the exhaust 42. In the illustrative example, these particulates (which are no longer pyrophoric since they have already undergone oxidation) are captured by the particulate exhaust filter 44; alternatively, the exhaust may flow into a scrubber system or other further processing components. As another alternative, the combusted particulates may be directly exhausted to atmosphere without going through the exhaust filter 44 if the combusted particulates are environmentally benign.

After filter regeneration is complete, the system is returned to the work configuration (FIG. 1), and the process chamber 12 is vented (e.g., via a vent valve, not shown) and the work piece loading door (not shown) is opened and the work piece 10 is removed and, if desired, a new work piece is loaded and the process is repeated.

The filter regeneration (FIG. 3) should be performed before the concentration of pyrophoric particulates on or in the filter 22 becomes high enough to risk a substantial auto-ignition during the work piece loading process (i.e., when the filter housing 24 is filled with air). In some embodiments, this may entail performing filter regeneration after each work piece is processed. On the other hand, if the pyrophoric particulate generation rate is low enough, it may be possible to perform processing on two, three, or more work pieces before performing filter regeneration. The decision of when to perform filter regeneration can be based on various informational sources. In an "open-loop" approach, the regeneration is done on a fixed cycle (e.g., after every three work pieces are processed, by way of illustrative example). Alternatively, it is contemplated to employ some sort of sensor that measures a signal indicative of the particulate load that the filter 22 is holding. In illustrative FIGS. 1-3, a flow or pressure sensor 52 at the inlet of the blower or pump 26 measures the flow or pressure at that inlet; from this value (and, possibly, also based on a motor current or other metric of the "effort" being expended by the blower 26), the flow resistance being imposed by the filter 22 can be estimated, and this is indicative of the particulate load on the filter 22. (That is, higher particulate load introduces more flow resistance).

As noted previously, the valve set V1, V2, V3, V4, V5 is optionally automatically controlled by a valve set controller 46. To further automate the system, this controller 46 optionally also operates the ignition source 50 (if included) during filter regeneration, and may optionally monitor the sensor 52 or other metrics to determine when filter regeneration should be performed. The controller 46 may also read a sensor or sensors such as a filter temperature sensor (not shown) to monitor the filter regeneration process and terminate filter regeneration at an appropriate point. (In this example, filter regeneration is suitably detected as being initiated when the filter temperature goes up, indicating combustion of the pyrophoric particulates has started. The filter regeneration terminates when the temperature drops back down below a threshold indicating that the combustion is substantially complete. The ignition source 50, if available, may also be re-activated after the temperature drops back to ensure that no particulate clumps remain to be burned off.)

Figure 4:
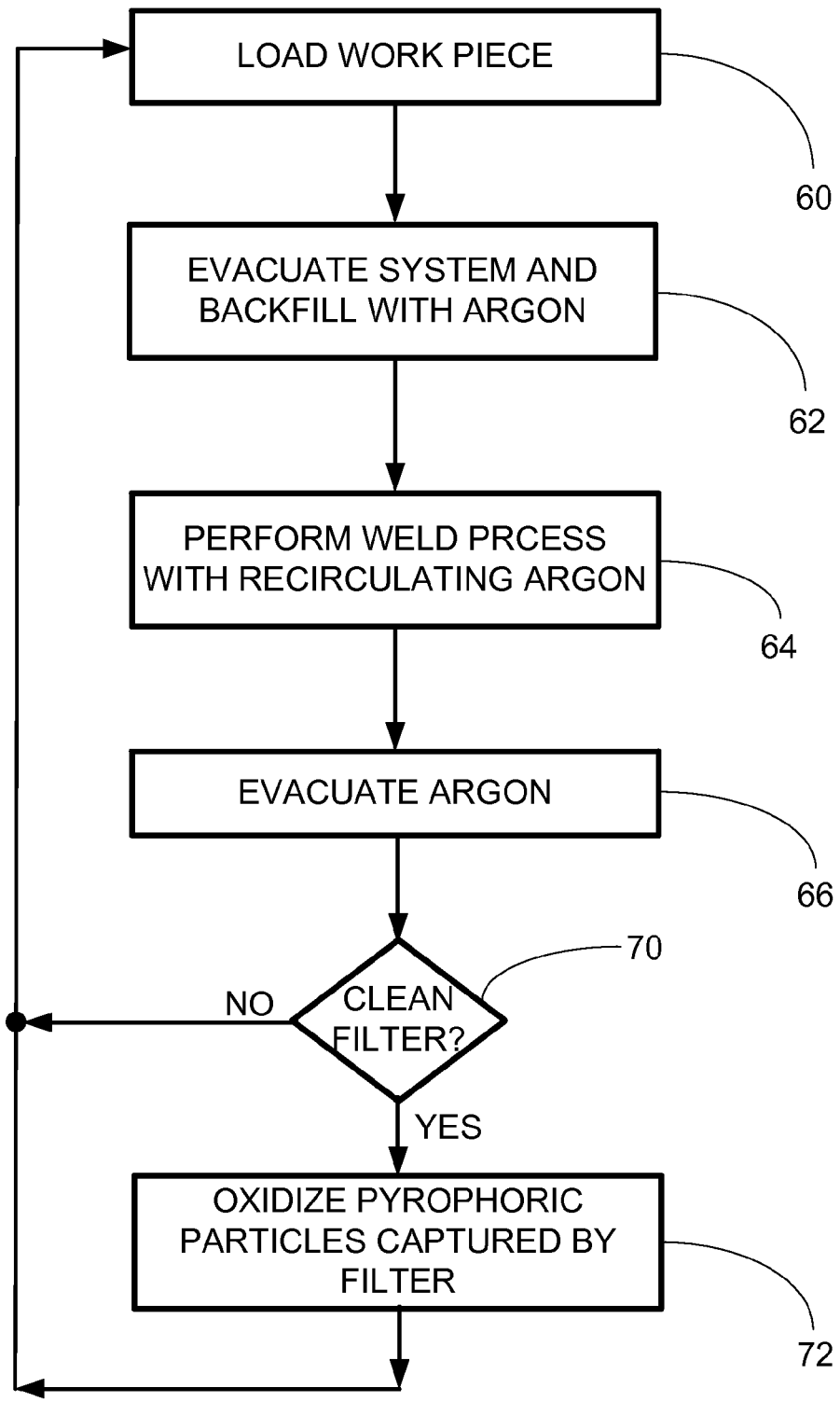
FIG. 4 diagrammatically shows a welding process suitably performed by the welding system of FIGS. 1-3.

With reference to FIG. 4, the overall process is summarized. In an operation 60, the work piece 10 is loaded into the process chamber 12. If the work piece is loaded via a door, this entails venting the chamber 12 to atmosphere via a suitable vent valve (not shown) and opening the chamber, and after loading the process chamber 12 is evacuated and backfilled with argon (again, this evacuation/fill processing is optionally repeated). Alternatively, if a load lock is provided then the work piece is loaded into the load lock which is then pumped down using a vacuum pump or house vacuum followed by opening a gate valve to transfer the work piece from the load lock into the process chamber 12. In this case the backfill operation 62 may be omitted or may be limited to a partial fill to replace any argon volume lost to the load lock. In an operation 64, the laser welding process is performed as described with reference to FIG. 1. In an operation 66, the process chamber 12 is evacuated as described with reference to FIG. 2. In an operation 70 it is decided whether filter regeneration should be performed. If no, then process returns to operation 60 to remove the completed work piece and to load a new work piece is one is queued for processing. On the other hand, if filter regeneration is to be performed then the filter regeneration operation 72 is performed as described with reference to FIG. 3, followed by return to operation 60 to remove the completed work piece and to load a new work piece is one is queued for processing.

The laser welding process described with reference to FIGS. 1-4 is merely illustrative, and numerous variations are contemplated. For example, different valve sets can be used to implement the various work, evacuation, and filter regeneration configurations. For example, if separate vacuum and argon lines are provided then the valve V1 is suitably replaced by separate valves for the vacuum and argon lines. Moreover, these lines may be located elsewhere than being directly connected with the process chamber. For example, one or both of the vacuum and argon lines (or the combined vacuum/argon line) may be located on the pipe 28 before valve V2, or on the pipe 30 after the blower 26. In some embodiments the evacuation operation 66 may be omitted, e.g. if the flow of regeneration gas is high enough to efficiently push the argon in the filter housing 24 out the exhaust 42. As another contemplated variation, the blower could be placed on pipe 28 if it can withstand exposure to low concentrations of pyrophoric particulates.

As a further contemplated variation, in some embodiments the regeneration gas may be delivered to the inlet side of the filter 22, and/or the exhaust may connect with the discharge side of the filter 22. In a pore-type metal filter plate, the disclosed approach of pushing the regeneration gas from the filter discharge side 34 to the filter inlet side 32 and thence to the exhaust 42 has the advantage that particulates that are too large to pass through the filter 22 (which are likely to be the particulates "caught" by the filter 22) ensures that the filter 22 does not block particulates from reaching the exhaust 42. However, if the combustion of pyrophoric particulates "breaks up" the particulates into smaller pieces that can pass through the filter 22, then the regeneration gas may be flowed from the inlet side. As another example, in the case of an electrostatic filter the electric power can be removed from the filter during filter regeneration, and in that case the regeneration gas can be fed into the filter from either the inlet or outlet.

An advantage of the disclosed systems is that the filter regeneration substantially extends the life of the filter 22. Indeed, in some embodiments the expected lifetime of the filter 22 may be high enough that it is not considered a consumable item of the system. Corollary benefits include reduced or eliminated potential for fire or explosion, thus enhancing personnel and equipment safety, as well as reduced waste (i.e., there is no spent filter to be disposed of).

Another advantage is that recirculation of the gas defining the controlled atmosphere greatly reduces the amount of gas that is expended in a given process run. For example, in some spacer grid laser welding applications it is expected that an argon flow rate of about 300 liters per minute or higher will be employed. This high flow rate is used to dissipate fumes (comprising at least in part pyrophoric particulates) which would otherwise coat the optical window 14 and occlude the laser beam 48. Recirculating and simultaneously filtering the argon flow will greatly reduce the argon consumption at these high flow rates.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
a process chamber configured to contain a work piece in a controlled atmosphere and to perform a process on the work piece in the process chamber that emits pyrophoric particulates into the controlled atmosphere;
a closed recirculating loop connected with the process chamber to recirculate gas defining the controlled atmosphere through the process chamber;
a filter disposed in the closed recirculating loop and configured to capture the generated pyrophoric particulates in the recirculating gas; and
a valve set configured to have (1) a work configuration defining the closed recirculating loop including the connection of the process chamber with the filter and (2) a filter regeneration configuration in which the filter is blocked off from the process chamber and is connected with an exhaust.

2. The apparatus of claim 1, further comprising:
an exhaust filter arranged to filter gas discharged at the exhaust.

3. The apparatus of claim 1, further comprising:
a regeneration gas source delivering regeneration gas containing oxygen;
wherein the working configuration of the valve set blocks the regeneration gas source from the closed recirculating loop; and
wherein the valve set in the filter regeneration configuration also connects the regeneration gas source to the filter to flow regeneration gas through the filter.

4. The apparatus of claim 3, wherein the regeneration gas source delivers compressed air.

5. The apparatus of claim 3, wherein the regeneration gas source delivers regeneration gas comprising greater than 22% oxygen.

6. The apparatus of claim 1, wherein the gas defining the controlled atmosphere is argon.

7. The apparatus of claim 1, wherein the gas defining the controlled atmosphere is an inert gas.

8. The apparatus of claim 1, wherein the filter comprises: at least one metallic filter plate.

9. The apparatus of claim 1, further comprising:
an ignition source configured to apply a spark or flame to the filter to ignite pyrophoric particulates captured by the filter.

10. The apparatus of claim 1, wherein the process chamber is configured at least by including an optical port to perform a laser welding process on the work piece in the process chamber, and the apparatus further comprises:
a welding laser arranged to perform laser welding on the work piece through the optical port.

11. A method comprising:
(0) providing the apparatus of claim 1;
(i) loading a work piece into the process chamber;
(ii) with the valve set in the work configuration, performing the process on the loaded work piece that emits pyrophoric particulates into the controlled atmosphere; and
(iii) after performing operation (ii), delivering regeneration gas containing oxygen to the filter with the valve set in the regeneration configuration.

12. The method of claim 11, wherein operations (i) and (ii) are repeated more than once before performing the operation (iii).

13. The method of claim 11, further comprising:
evacuating the controlled atmosphere from the process chamber after performing operation (ii) and before performing operation (iii).

14. The method of claim 11, wherein:
operation (i) comprises loading a work piece comprising a zirconium alloy into the process chamber; and
operation (ii) comprises performing laser welding of the work piece.

15. The method of claim 11, wherein:
operation (i) comprises loading a work piece comprising interlocked zirconium alloy straps into the process chamber; and
operation (ii) comprises laser welding the interlocked zirconium alloy straps together to construct a nuclear fuel assembly spacer grid component.

16. The method of claim 11, wherein:
operation (i) comprises loading a work piece comprising interlocked metal straps into the process chamber; and
operation (ii) comprises laser welding the interlocked metal straps together to construct a nuclear fuel assembly spacer grid component wherein during the laser welding the metal straps emit pyrophoric particulates into the controlled atmosphere.

17. An apparatus comprising:
a process chamber configured to contain a work piece in a controlled atmosphere and to perform a process on the work piece in the process chamber that emits pyrophoric particulates into the controlled atmosphere;
a closed recirculating loop connected with the process chamber to recirculate gas defining the controlled atmosphere through the process chamber;
a filter disposed in the closed recirculating loop and configured to capture the generated pyrophoric particulates in the recirculating gas wherein the filter has an inlet side receiving gas flowing from the process chamber and a discharge side; and
a valve set configured to have (1) a work configuration defining the closed recirculating loop including the connection of the process chamber with the inlet side of the filter and (2) a filter regeneration configuration in which the inlet side of the filter is blocked off from the process chamber and is connected with an exhaust.

18. The apparatus of claim 17, further comprising:
a regeneration gas source delivering regeneration gas containing oxygen;
wherein the working configuration of the valve set blocks the regeneration gas source from the closed recirculating loop; and
wherein the valve set in the filter regeneration configuration also connects the regeneration gas source to the outlet side of the filter to flow regeneration gas into the discharge side of the filter.

19. The apparatus of claim 17, wherein the filter comprises: at least one metallic filter plate.

20. The apparatus of claim 19, wherein the at least one metallic filter plate includes a metallic filter plate having a pore size of 0.2 micron or smaller.

21. The apparatus of claim 19, wherein the at least one metallic filter plate includes a metallic filter plate having a pore size of 0.5 micron or smaller.

22. The apparatus of claim 19, wherein the at least one metallic filter plate includes a metallic filter plate having a pore size of 1.0 micron or smaller.

23. The apparatus of claim 19, wherein the at least one metallic filter plate includes a metallic filter plate having a pore size of 2.0 micron or smaller.

24. The apparatus of claim 17, wherein the valve set further has (3) an evacuation configuration in which a vacuum line draws the controlled atmosphere from the discharge side of the filter.

25. A method comprising:
(0) providing the apparatus of claim 17;
(i) loading a work piece into the process chamber;
(ii) with the valve set in the work configuration, performing the process on the work piece loaded in the process chamber that emits pyrophoric particulates into the controlled atmosphere; and
(iii) after performing operation (ii), delivering regeneration gas containing oxygen to the discharge side of the filter with the valve set in the regeneration configuration.

26. The apparatus of claim 1 wherein the work configuration of the valve set does not provide a flow path from the process chamber to the exhaust.

27. The apparatus of claim 17 wherein the work configuration of the valve set does not provide a flow path from the process chamber to the exhaust.

28. The apparatus of claim 18, wherein the regeneration gas source delivers regeneration gas comprising greater than 22% oxygen.

29. The apparatus of claim 17, further comprising:
an ignition source configured to apply a spark or flame to the filter to ignite pyrophoric particulates captured by the filter.

* * * * *